United States Patent [19]
Hack

[11] 3,811,327
[45] May 21, 1974

[54] BALANCING APPARATUS WITH AN OPTICAL UNBALANCE INDICATOR

[75] Inventor: Heinrich Hack, Spachbruecken, Germany

[73] Assignee: Carl Schenck Maschinenfabrik GmbH, Darmstadt, Germany

[22] Filed: Apr. 3, 1973

[21] Appl. No.: 347,463

[30] Foreign Application Priority Data
Apr. 11, 1972  Germany............................ 2217264

[52] U.S. Cl. ................................................. 73/465
[51] Int. Cl. ............................................. G01m 1/08
[58] Field of Search ............................... 73/462, 465

[56] References Cited
UNITED STATES PATENTS
3,507,157    4/1970    Hack.................................. 73/462
3,554,061    1/1971    Holdinghansen ................. 73/465

FOREIGN PATENTS OR APPLICATIONS
821,556    10/1959    Great Britain....................... 73/465

Primary Examiner—James J. Gill
Attorney, Agent, or Firm—W. G. Fasse; W. W. Roberts

[57] ABSTRACT

The present balancing apparatus includes an optical indicator which enables the operator to balance a workpiece, for example an impeller wheel of a super charger, in two balancing planes, even simultaneously, if desired. Two vector meters with respective display screens are used one for each balancing plane. A light spot providing an unbalance indication and further optical markings are projected onto the respective screen to provide direct information regarding the unbalance location and regarding the nature of the balancing operation to be performed. The optical markings are projected with the aid of selsyn driven diaphragms having slots therein which are shaped to correspond to the shape of the markings. Due to the selsyn drive the workpiece rotation and the diaphragm rotation are synchronized with each other whereby the operator may read off all the information from the two screens for balancing the workpiece without any extra calculations.

17 Claims, 13 Drawing Figures

BALANCING APPARATUS WITH AN OPTICAL UNBALANCE INDICATOR

BACKGROUND OF THE INVENTION:

The present invention relates to a balancing apparatus, more specifically, a balancing apparatus including optical unbalance indicator means for ascertaining and indicating an unbalance of a body to be balanced hereafter referred to as the workpiece, whereby the indication is displayed on an indicator screen. The screen displays a first optical marking which, for example in the form of a light spot, indicates in a vectorial manner the size and direction of the measured unbalance value. A second optical marking which is correlated to a fixed angular position of the workpiece is also displayed. The two optical markings are brought to coincidence with each other by rotating the workpiece.

In a prior art balancing machine as for example disclosed in German Patent Publication DAS 1,076,399, the measured unbalance value is displayed for each balancing plane as an indicating spot, for example, as a light spot on an indicating screen which is provided with a bunch of concentric circles, whereby the indicating spot displays the size and angular position of the unbalance relative to the origin or center of the concentric circles. A line extending through the center of the concentric circles is projected simultaneously onto the screen. The line is produced by means of a diaphragm which rotates in synchronism with the workpiece. Thus, said line is correlated to a fixed predetermined angular position on the workpiece. If after the conclusion of a measuring sequence, said line is brought to coincidence with the indicating spot by rotating the workpiece and its support by hand, the unbalance point or area of the workpiece will be located in a predetermined position relative to the balancing apparatus, for example, in the position where a machining device may be brought into operational contact with the workpiece. Such machining device may, for example, comprise a drilling unit or milling unit or means for adding material to the workpiece to balance it.

The possibilities of balancing by means of material removal from any random portion of the workpiece are limited in connection with certain workpieces, especially due to structural reasons. For example, the structural strength of the balanced workpiece must not be impaired by the material removal for achieving the balancing. Typical examples of such workpieces are impeller wheels, wheels for turbo super chargers or wheels of centrifugal pumps. In these and similar examples, it is necessary that the balancing takes place at a predetermined diameter. Simultaneously, the axial depth of the machining is also limited whereby larger quantities of material for compensating larger unbalances may be removed only by increasing the amount of removed material in both circumferential directions as viewed relative to the angular position of the unbalance. A similar difficulty occurs when the unbalance compensation involves the addition of material especially when the radial as well as the axial extension of the material to be applied is limited, for example, due to the structural features of the workpiece or due to technological reasons.

Heretofore, it was necessary to calculate the quantity of material to be removed or the quantity of material to be applied on the basis of the size of the displayed unbalance vector whereby the application or removal had to take place at the position indicated by the angular position of said unbalance vector. It was further necessary to calculate in which manner this amount of material could be distributed over the range of the angular unbalance position without exceeding the given limitations as mentioned above. For example, it was necessary heretofore to calculate the depth of any hole to be drilled or the number of holes to be drilled next to each other. Where the unbalance compensation was to be accomplished by a material removal along a portion of a circular path, it was necessary to calculate the circumferential angle for said portion and the calculated circumferential angle had to be converted into a respective tilting movement of the workpiece during the balancing operation. These steps required substantial additional work and further, they used to constitute a substantial source of errors.

OBJECTS OF THE INVENTION

In view of the foregoing, it is the aim of the invention to achieve the following objects singly or in combination:

to construct a balancing machine as described above in such a manner that a balancing may be accomplished even for those workpieces which require a balancing within a predetermined diameter and/or within a predetermined axial depth;

to provide means for directly indicating positional information for the required rotation of the workpiece into the balancing position;

to also directly indicate the quantitative information required for the machining operation or for the material addition; and to give said positional and quantitative information in such a manner that the operator can perform the balancing operation by directly reading off the information from a display screen without any calculations.

SUMMARY OF THE INVENTION

The above objects have been achieved according to the invention in that the optical marking of the angular position which is fixed relative to the workpiece is formed by at least two lines which are arranged symmetrically relative to a radius which corresponds to said angular position whereby the angular spacing between said two lines on each circle around the vector center corresponds to the angular dimension within which the balancing operation may be performed. This teaching has the advantage that the required informations are directly seen on a display screen which shows over which angle the machining will extend in order to compensate an unbalance which is indicated in a vectorial manner by the display spot. The optical marking formed by said at least two lines is connected with the workpiece for synchronious rotation therewith, for example by a selsyn drive. Therefore, it is possible not only to register the unbalance position with a certain station in the balancing apparatus, for example the work or machining station, by tilting the workpiece as is the case in prior art balancing apparatus, it is now also possible according to the invention to tilt or rotate the unbalance position of the workpiece relative to said predetermined station of the balancing apparatus by an amount corresponding to the length of the circular path of the optical marking. This feature makes it possible to adjust a predetermined angular spacing of balancing machinings without any calculations or without the use of any diagram tables. This angular spacing may, for example, designate the beginning and the end of a circular recess to be machined or milled off. Similarly, this angular spacing may determine the distance between several holes to be drilled.

According to the invention it is also possible to compensate an unbalance by milling off a segment or circular recess of the workpiece, said segment having a predetermined depth and radius. For this purpose, the invention provides that the arcuate spacing between the two lines of the optical marking corresponds on each circle around the vector center to the respective segment or circular recess to be milled off for compensating the corresponding unbalance. The length of the arcuate spacing represents the unbalance along the respective circle and hence indicates the amount of machining required for achieving the balancing.

The shape of the two lines forming the optical marking and thus the shape of respective slots in diaphragms for projecting the two lines onto a display screen may be calculated from the circular recess or segment required for the balancing. The respective path or segment again may be calculated for each unbalance value from the constant maximum depth and from the radial dimension of the segment to be milled off. After these lines are determined, for example, through the selection of the respective diaphragm no further calculation is necessary and all workpieces of the same type may be balanced with the aid of the same diaphragm. If a different type of workpiece is to be balanced merely the diaphragm will be exchanged against another diaphragm the slots of which have been calculated with regard to the structural features of the other type of workpiece. The milling off is accomplished by tilting the workpiece until the optical marking is moved from a first coincidence between the stationary light spot and one of the lines into a second coincidence between the spot and the other line. The milling tool is in operative engagement with the workpiece during the time between the two coincidences as just described. The milled off segmental portion produced as just described represents the minimum balancing.

The balancing by drilling holes into the workpiece may also be accomplished according to the invention, having a predetermined diameter and a limited depth. For this purpose, the invention provides that the optical marking lines are shaped as straight lines extending radially relative to the vector center whereby the arcuate spacing between the straight lines corresponds to the angular spacing between the holes to be drilled. The radius of the vector to the display spot represents a value for the compensation quantity preferably the depth of the holes to be drilled. The display of the desired compensation quantity is achieved in this instance by the number of radial straight lines crossing the circle corresponding to the size of the unbalance, namely the circle coinciding with the display spot. Stated differently, there are more straight lines at a larger distance from the vector center than closer to the vector center. A hole of predetermined dimensions will be drilled at each angular position of each straight line.

According to another embodiment of the invention, it is possible to project on the display screen a line which indicates the balancing value, preferably the depth of the hole being drilled, whereby in addition to the angular position, it is possible to display the current depth of a drilling preferably the depth of the intermediate hole of several holes so that the production of the balancing may be followed directly on the display screen.

When the balancing is accomplished by means of drilling holes of predetermined diameter and limited depth, it is practical to provide concentric circles on the display screen around the vector center which circles correspond to a respective drilling depth. The drilling depth may be indicated by a respective number next to the corresponding circle. In this manner it is possible to continuously adapt the unbalance compensation to the measured unbalance by reading from the display screen not only the number and the angular spacing of the holes being drilled, but also their depth, whereby these three values may be monitored during the drilling.

An especially advantageous embodiment according to the invention provides that the milling off of an arc or segment on one side of the workpiece or the drilling of holes into the other side of the workpiece is performed on the same balancing machine and even simultaneously. Thus, for example, it is possible to balance a super charger wheel on the balancing machine in two planes whereby the present teaching takes into account that the material removal on the entrance end of the super charger wheel can be accomplished only by milling off a segment on the hub of the wheel and that only holes may be drilled into the back of the wheel, whereby such holes must have a given spacing from each other depending upon the structural features of the respective wheel type. Advantageously, the milling of the segment and the drilling of the holes may be accomplished simultaneously whereby axially effective forces resulting from the machining on the workpiece may be compensated at least partially.

According to a further embodiment of the invention, in which the balancing involves the attachment of weights to the circumference of the body to be balanced it is provided that the arcuate spacing between the two lines on each circle around the vector center defines the circumferential length of the weight to be applied. Thus, from the arc length which may be read directly from the display screen, it is possible for example to ascertain the length of a strip of sheet metal which is to be attached to the workpiece for accomplishing the balancing.

According to yet another embodiment of the invention which is especially suitable for the range of relatively small unbalances which do not require any balancing machining of any arcuate extent, it is provided that the two lines coincide in the range close to the vector center, whereby they form a radially extending straight line defining an unbalance range in which the balancing may be accomplished solely by a drilling operation of the milling tool to a predetermined depth. In the range of these small vector values the milling tool is used as a drill whereby the drilling depth is selectable for achieving the desired balancing.

BRIEF FIGURE DESCRIPTION

In order that the invention may be clearly understood, it will now be described, by way of example, with reference to the accompanying drawings, wherein.

DETAILED DESCRIPTION OF EXAMPLE EMBODIMENTS

Figure 1:
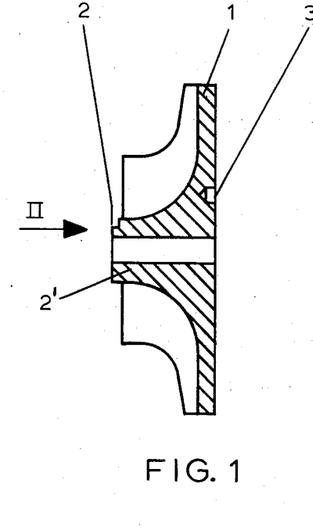
FIG. 1 is a sectional view through a super charger wheel provided with a balancing machining in two different balancing planes.
Figure 2:
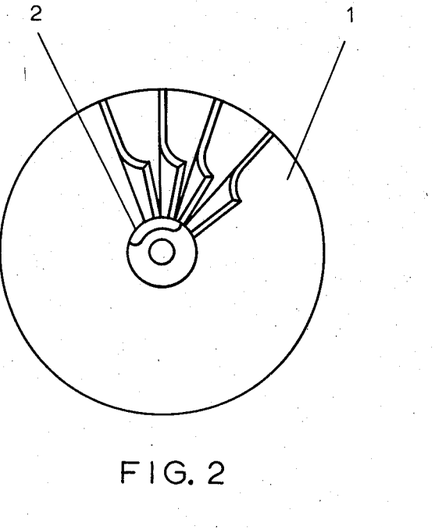
FIG. 2 illustrates a front face view of the wheel according to FIG. 1, as viewed in the direction of the arrow II.

The charger wheel 1 shown in FIGS. 1 and 2 may, for example, be the wheel of an exhaust turbo-super charger which operates at very high revolutions per minute. The wheels of the compressor and of the turbine in an exhaust turbo-super charger must be balanced prior to their installation.

The possibilities for the balancing of such wheels are predetermined by the structural features of the wheels. At the inlet or input end which is the end facing the arrow II, a portion 2 may be machined off from the hub 2' of the wheel. On the back face holes 3 may be drilled whereby the holes must have a given minimum spacing from each other and they must not exceed a predetermined maximum depth.

Figure 3:
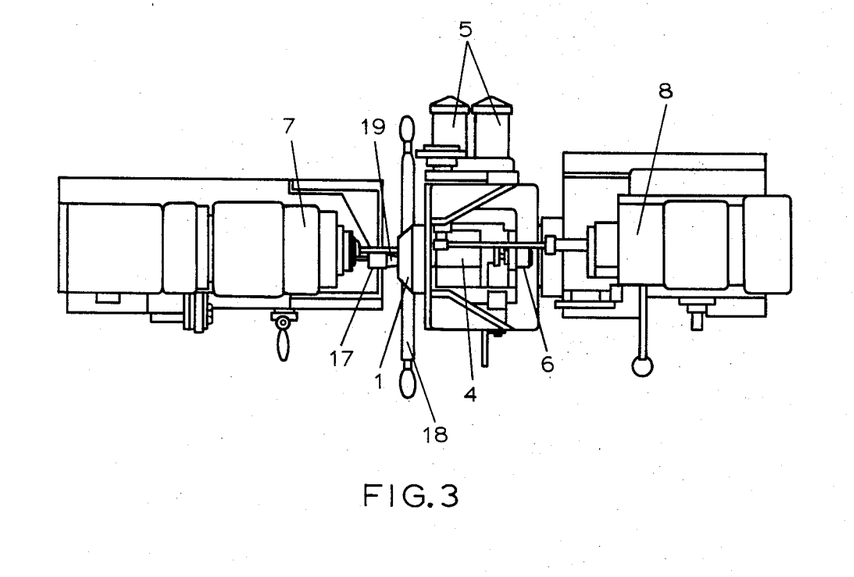
FIG. 3 is a plan view of a balancing machine whereby the control means as well as the indicating means have been omitted for simplicity's sake.

The balancing apparatus for performing the measuring end and the balancing of the wheel 1 is shown in FIG. 3 and comprises substantially an unbalance measuring unit 4 including a spring supported balancing spindle, a drive motor and two oscillation pick-up members 5. The balancing spindle is connected to a selsyn drive 6 which is part of a synchro-tie by means of which the angular position of the balancing spindle is transmitted to the indicating instruments as will be explained in more detail with reference to FIG. 7. As mentioned, the input end of the super charger wheel 1 faces to the left in FIG. 3. Therefore, the balancing apparatus comprises at its left hand side a milling unit 7 by means of which an arc shaped recess 2 is milled off from the circumference of the hub 2' of the wheel 1. The right hand end or back face of the wheel 1 faces toward a drilling unit 8 arranged for drilling individual holes 3 into the back face of the super charger wheel 1. The bearing housing of the balancing spindle is so narrow that the drill of the drilling unit 8 can by-pass the bearing housing of the spindle.

Figure 4:
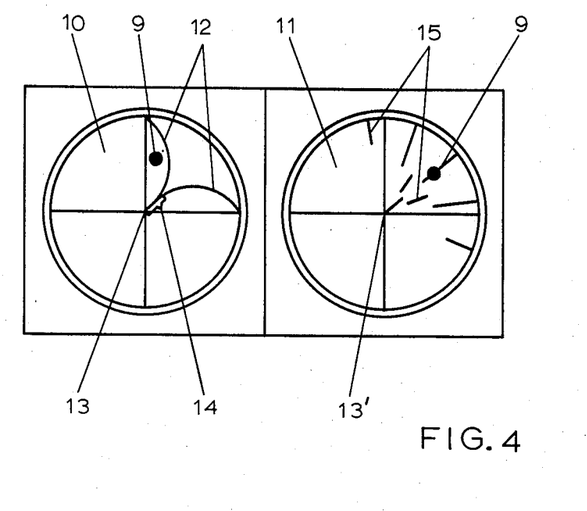
FIG. 4 is a front view of the optical indicating device comprising two display screens.
Figure 7:
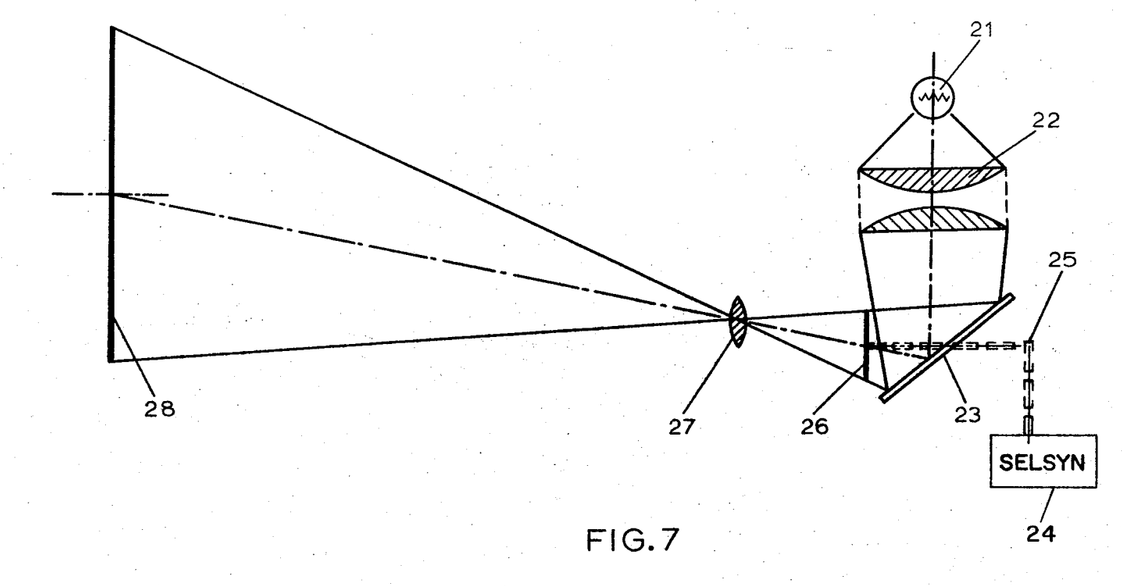
FIG. 7 shows schematically the arrangement of a diaphragm relative to the display screen.

The present balancing apparatus comprises two light spot vector meters shown in FIG. 4 with their respective display screens 10 and 11. The left display screen 10 is arranged for displaying the balancing information relating to the left hand end or balancing plane of the wheel 1 whereas the right display screen 11 is arranged to display the balancing information relating to the right hand end face or balancing plane of the wheel 1. The light spots 9 indicate in a vectorial manner the size and angular position of the unbalance, whereby the angular position of the unbalance is displayed with reference to a fixed origin of the balancing machine. The spacing of the light spot from the origin of the respective display screen represents the size of the unbalance. These two values, namely the spacing and the angle, constitute a vector value which must be transmitted to the body to be balanced. Stated differently, the body to be balanced is to be rotated or adjusted in such a manner that the machining tool by means of which material is to be removed or added will face the area or portion of the body to be balanced where the correction has to be made, for example, an area which is too heavy. Thereafter, it is to be determined from said vector value how many holes are to be drilled, to what predetermined depth or over which angle the arc shaped recess is to be machined into the hub 2'. For this purpose, optical markings are projected onto the two display screens 10 and 11 of the vector meters by a respective diaphragm 26 as shown in FIG. 7. These diaphragms are coupled by a synchro-tie to the selsyn drive 6 and thus to the balancing spindle so that the optical marking rotates in synchronism with the body to be balanced.

The optical marking on the display screen 10 of the left hand vector meter which is allocated to the left hand balancing plane and thus represents the milling operation, has a shape looking similar to a cycloid curve having branches 12 which coincide with each other toward the origin of the dial center 13 whereby a radially extending straight line 14 is formed. Both curve branches 12 extend symmetrically relative to a radius which corresponds to a given angular direction of the body 1 to be balanced.

The optical marking on the right hand display screen 11 comprises a plurality of radially extending interrupted straight lines 15 which extend symmetrically relative to a predetermined radius. In the vicinity of the origin 13' of the right hand screen 11 only one straight line 15 is provided. However, the larger the distance from the origin 13' the larger will be the number of the straight line portions 15.

As shown in FIGS. 6a to 6d, the display screen 11 comprises a plurality of concentric circles 16a, 16b, 16c, 16d which are provided with numerical values indicating the drilling depth as will be described in more detail below with reference to performing a balancing operation. The optical markings 12 and 15 on the two display screens 10 and 11 comprise all the information required for performing the balancing in two balancing planes.

The carriage or tool support of the milling unit 7 shown in FIG. 3 is connected to a chucking and centering cone 17 which is moved against the charger wheel 1 in order to press the latter toward the right. Thus, the back face or right hand face of the charger wheel 1 bears against a supporting surface forming part of a tilting wheel 18. When the tilting wheel 18 is rotated by hand, the charger wheel 1 is entrained and thus also rotated accordingly.

BALANCING OPERATION BY MILLING

Figure 5A:
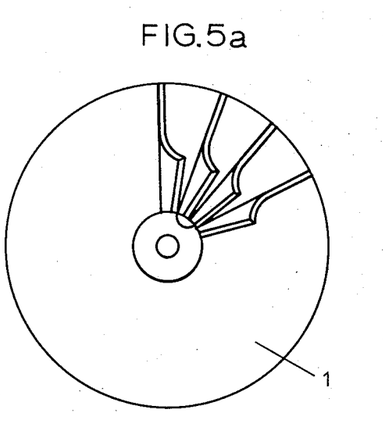
FIGS. 5a + 5b illustrate schematically the correlation of the position of the body to be balanced and the optical marking at the beginning of a machining sequence in which an arcuate recess will be milled into the workpiece.
Figure 5B:
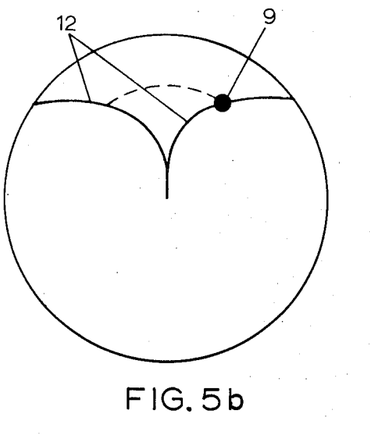
Figure 5C:
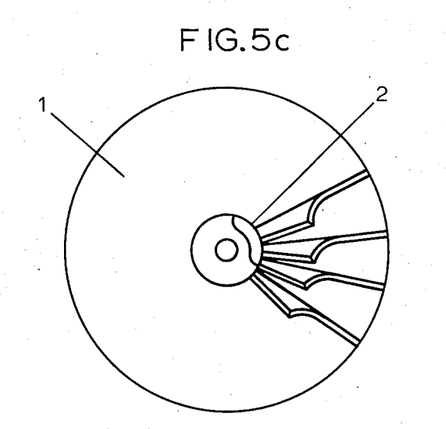
FIGS. 5c + 5c illustrate the correlation similar to FIGS. 5a + 5b, however, now at the end of said machining sequence.
Figure 5D:
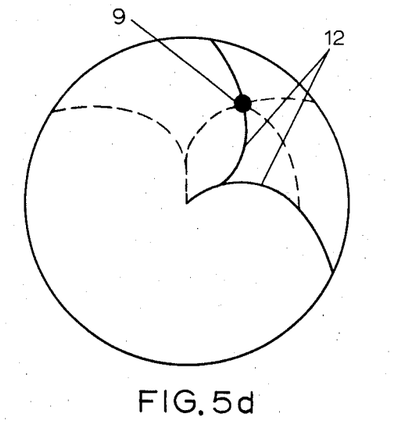

When it is desired to balance a wheel 1 by milling an arc shaped recess in the wheel 1 as shown in FIGS. 5a and 5c, the screen presentation illustrated in FIGS. 5b and 5d is employed. In accordance with the invention the cycloid curves 12 or rather the respective slots in the diaphragm (FIG. 7) are pre-calculated dependent upon the type of workpiece to be balanced whereby the depth of the recess also depends on the type of workpiece. A diaphragm having the desired cycloid slot configuration is inserted in the machine for projecting the cycloid lines 12 on the screen. If different types of workpieces are to be balanced, diaphragms with different slot configurations will be used.

The wheel 1 is mounted in the balancing apparatus shown in FIG. 3. The wheel 1 is then rotated for determining the amount and location of unbalance according to conventional practice. In this portion of the operation the light spot is deflected radially out of the origin of the dial a distance which corresponds to the extent of the unbalance. The light spot further indicates the angular position of the unbalance in the workpiece. The radial position of the spot 9 is held at this position during the subsequent milling operation. After thus locating the light spot the workpiece is rotated by hand with the aid of the hand wheel 18 during the milling operation, (FIG. 3). However, first the light spot 9 is brought to coincide with one of the branches of the cycloid curve 12, for example the right branch, as shown in FIG. 5b. It is immaterial whether the spot 9 is first brought into registration or coincidence with the left or with the right branch of the curve 12. The milling tool 19 of the milling unit 7 is then advanced manually to the permissible depth, i.e. the depth corresponding to the calculated cycloid curves 12. This depth may be assured by means of adjustable stops in the milling unit. As soon as the milling tool is advanced to the predetermined depth, for example by contacting the stops in the milling unit, the workpiece 1 is rotated by means of the wheel 18 which is rotated manually in a direction so that the arcuate path 12' travels through the stationary light spot 9 from the branch of curve 12 with which the light spot 9 first registered to the other branch of curve 12. The arcuate path 12' is shown in FIGS. 5b and 5d. The manual rotation of the wheel 18 is stopped when the light spot 9 coincides with the other branch of the curve 12. The milling tool is then withdrawn. As a result of the just described steps an arcuate recess 2 (FIG. 5c) is formed in the workpiece 1 and the recess has the required depth and length to properly balance the workpiece 1. The advantage of this just described operation is that the operator may directly read the beginning and completion of the balancing operation from the display screen without any extra calculation.

Since the workpiece 1 to be balanced is coupled to the selsyn drive 6 at the rear end of the balancing spindle, it is also coupled to the optical markings 12 (FIGS. 5b and 5d) and to the optical markings 15a, 15b, 15c, and 15d (FIGS. 6a to 6d) which are projected onto the display screens 10 and 11 of the respective vector meters. Due to this coupling the two markings 12 follow the angular movement of the workpiece 1. When the workpiece has been moved sufficiently so that relative to the fixed display spot 9 the circular path 12' has been traversed as shown the left end of the workpiece 1 has been balanced as described. FIG. 5d shows that the display markings have moved from the dashed lines to the full lines while the display spot 9 remained stationary. However, the movement could also have been in the opposite direction, whereby the described beginning of the path 12' would be the end and vice versa.

The chucking and centering cone 17 also bears against the workpiece 1 when the right hand end or plane of the workpiece 1 is being balanced so that the workpiece 1 may be tilted into the balancing position. Depending upon the radial position of the display spot 9, that is, depending upon the size of the unbalance vector, up to five holes may have to be drilled to compensate for the unbalance.

BALANCING OPERATION BY DRILLING

The workpiece may also be balanced by drilling one or more holes 3 in the workpiece. A typical display employed in accordance with the invention for indicating the depth, the locations and the required number of holes to be drilled to accomplish the balancing of the workpiece is illustrated in FIGS. 6a to 6d which correspond to different unbalance conditions depending upon the particular location of the light spot 9. As in the operation described with reference to FIGS. 5a to 5d, the apparatus is first controlled to project the light spot on the screen at a radial distance representing the unbalance. The spot is held at this position during the drilling operation. The slots in the diaphragm for projecting the light pattern illustrated in FIGS. 6a to 6d is again determined by calculations based on the particular type of workpiece to be balanced.

Figure 6A:
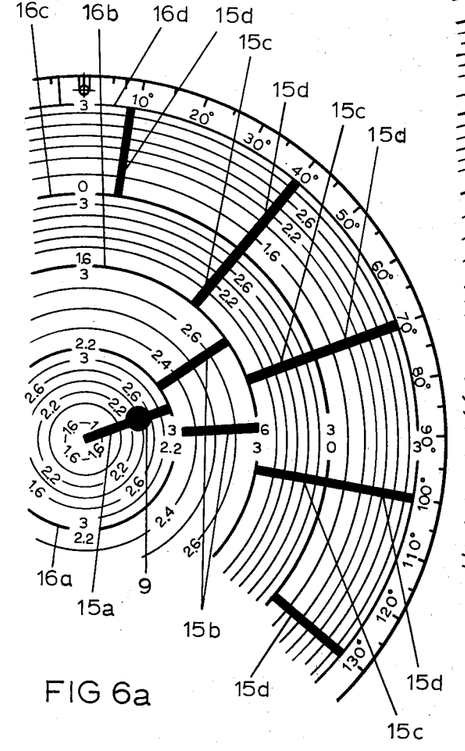
FIGS. 6a to 6d illustrate the dial of a display screen for the balancing by means of a drilling operation.

Referring specifically to FIG. 6a, the light spot 9 is located within a first circle 16a concentric to the origin 13' of the dial on the screen. The pattern of light markings projected on the screen comprises a radially extending line 15a between the origin and said first circle 16a, a pair of radial lines 15b extending between the circle 16a and a second circle 16b of larger diameter, three radial lines 15c extending from the circle 16b to a third concentric circle 16c of greater diameter than the circles 16b, and five radial lines 15d extending from the circles 16c to a fourth concentric circle 16d. The mentioned concentric circles 16a to 16d and the intermediate concentric circles provide a scale from which the depth of the holes required for the balancing may be directly read off where the light spot 9 coincides with said circles. The number of radially extending markers indicate the number of holes to be drilled depending on where the light spot is located. These markers also indicate by their angular positions where the holes are to be located in the workpiece. Thus, according to FIG. 6a one hole is necessary having a depth of 2.5 mm, because the spot 9 is located within the first circle 16a at the depth circle 2.5.

The operational steps are quite similar to those described with reference to FIGS. 5a to 5d. The wheel 18 of the apparatus of FIG. 3 is rotated manually to enable the operator to bring a radially extending line marker 15a, 15b, 15c, or 15d into registration with the light spot 9.

Assuming that the extent of the unbalance displaces the light spot 9 to a position within the first circle 16a, as illustrated in FIG. 6a, the operator will rotate the wheel 18 until the radial line 15a extends through the light spot 9. The operator then drills a single hole in the workpiece to a depth indicated by the marked depth circle on the screen. For example, as illustrated in FIG. 6a, the hole would be drilled to a depth of 2.5 mm for balancing the workpiece as mentioned above. The depth of the hole may be controlled by suitable stops in the drilling apparatus selected by the operator after reading the depth from the dial.

Figure 6B:
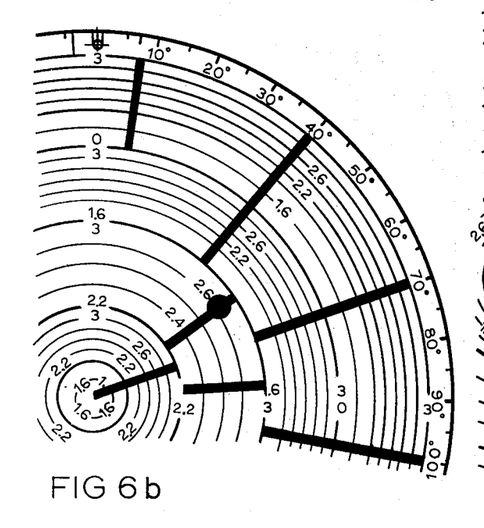
Figure 6C:
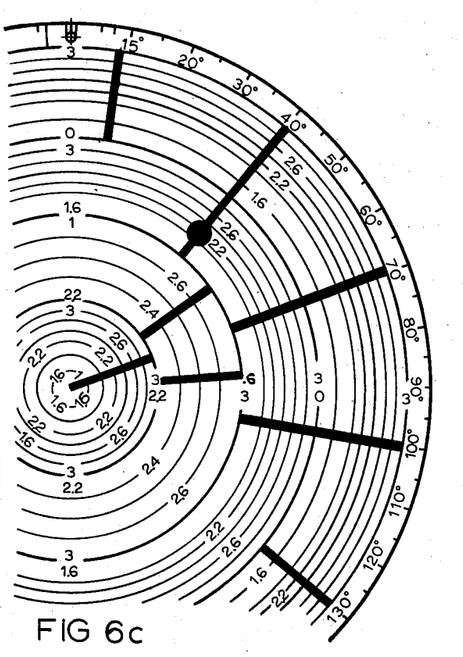
Figure 6D:
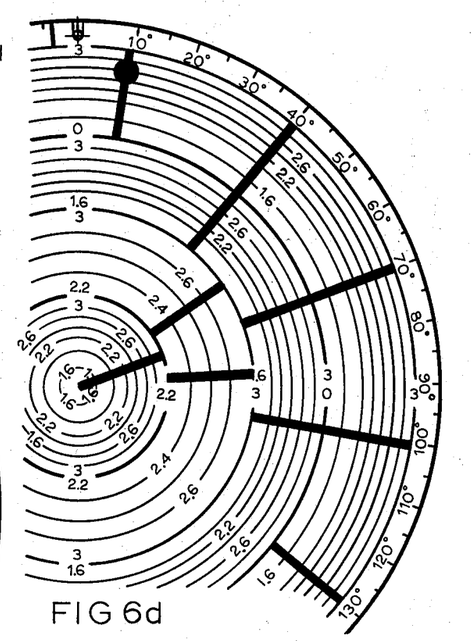

If a greater unbalance is indicated, as shown in FIG. 6b, wherein the spot 9 is between the circles 16a and 16b, then two holes must be drilled to effect the balance of the workpiece. As shown in FIG. 6b, the spot 9 is first brought into registration with one of the radial line markers 15b, and a hole is drilled in the workpiece to a depth of 2.8 mm as indicated by the respective depth circle coinciding with the marker and the light spot. The wheel 18 is then rotated until the spot 9 registers with the other radial line marker 15b and another hole is drilled at this location to the same depth of 2.8 mm, whereby the workpiece is balanced.

Where the light spot is located as illustrated in FIG. 6c, between the circles 16b and 16c three holes must be drilled in the workpiece. When the spot 9 is deflected to a position between the circles 16c and 16d as illustrated in FIG. 6d, five holes must be drilled to effect the balancing of the workpiece. The calibration may be such that all three holes are drilled to the same depth of, for example 2.2 mm. The position of the holes is determined by the position of the light markings 15c. Thus, the workpiece is rotated until the radial lines 15c coincide sequentially with the light spot 9. At each coincidence the respective hole is drilled. Where five holes are required to balance the workpiece the holes may also be drilled to the same depth, for example 2.6 mm as shown in FIG. 6d. In any event, the arcuate spacing between adjacent radially extending markers and thus between adjacent holes is determined by the structural features of the workpiece 1 whereby a minimum spacing between the balancing holes 3 must be maintained as determined by the particular workpiece.

However, where three or five holes must be drilled, the calibration may be such that the outer holes are drilled to a full depth, that is to a depth corresponding on the dial to the distance between a pair of adjacent circles 16. Such distance may, for example correspond to 3.0 mm. Thus, when three holes are to be drilled, the outer holes may be drilled first to the full depth of 3.0 mm and the central hole will be drilled to the depth indicated by the spot 9, namely 2.2 mm according to FIG. 6c. When five holes are to be drilled to balance the workpiece the four outer holes may be first drilled to the full depth represented by the distance between circles 16c and 16d, and the central hole will be drilled to a depth of 2.6 mm as indicated by the light spot 9 in FIG. 6d. Preferably, the outer holes are drilled first to the full depth by advancing the drilling means against a fixed stop. Thereafter the central hole is drilled under the control of a depth measuring device known as such.

As shown in FIGS. 6a to 6d, the circles 16a, 16b, and 16c at the boundary between the one, two, three, and four hole ranges are provided respectively with two measure indications. This means that it is optional whether the smaller or larger number of holes should be drilled when the light spot 9 is located on one of these boundary circles. However, once the number of holes is selected, the respectively applicable depth indication will be controlling. For example, when the light spot 9 is on the circle 16a, the operator may drill either one hole with a depth of 3.0 mm or two holes each with a depth of 2.2 mm but not both.

The following applies to the display on both screens 10, 11 of the two vector meters. Only one hole will be drilled or the milling means will be advanced merely in axial direction respectively without any tilting movement of the wheel 18 when the light spot 9 is located in the vicinity of the coordinate origin 13 or 13', whereby the spacing of the light spot 9 from the origin 13 or 13' indicates the required depth of the hole. Therefore, the two branches of the curve 12 coincide with each other in the vicinity of origin on the display screen of the left hand vector meter to form the straight line segment 14.

It should be noted here that the shape of the optical markings 12 will vary in accordance with the particular type of milling tool used, especially if the diameter or the milling depth should vary, the shape of the markings 12 will vary accordingly, because for removing a predetermined quantity of material another arcuate length will now be required. Accordingly, a diaphragm with differently shaped curves would be used. Similarly, the circular dial will have to be changed if the diameter of the drill or the depth of the hole has been changed. The arrangement of the optical markings 15 on the display screen 11 of the right hand vector meter will change if due to different structural features of the workpiece different spacings are required for the holes to be drilled.

It is possible to construct the present apparatus in such a manner that the milling on the left hand side of the workpiece 1 and the drilling on the right hand side of the workpiece 1 are carried out simultaneously. For this purpose, it is necessary that the milling tool and the drill may perform a tilting or pivoting movement relative to each other about the axis of the workpiece in order to adjust the relative position of the drill and of the milling tool to each other prior to the machining process whereby such relative positions are determined by the position of the unbalances in both planes of the workpiece. Further, it is necessary that the milling tool can perform a continuous tilting movement relative to the workpiece during the milling operation, whereas the drill must be tiltable in steps relative to the workpiece.

It is also possible to use an apparatus in which instead of the hole depth readings on the concentric circles 16 a line is projected onto the display screen which line indicates the respective drilling depth. For example, such a line could be a spiral extending about the vector center or origin of the display screen, whereby the spiral would be rotatable and the angle of rotation of the spiral would indicate the required drilling depth. Thus if the spiral is rotated until it coincides with the light spot 9, the drill has reached the required drilling depth. It should be noted here that such a spiral would not be continuous but would have a jump or break at the juncture between two and three holes and so forth. This is disclosed, for example, in U.S. Pat. No. 3,507,157, granted Apr. 21, 1970 to Heinrich Hack.

The special advantage of the balancing machine according to the invention is seen in that it accomplishes a substantial simplification and acceleration of the balancing procedure. Any calculation of values and angles is obviated. The display may be read in a reliable manner by persons even without special training or experience whereby the chances of errors are substantially eliminated.

FIG. 7 illustrates schematically the means for projecting the light markings 12 or 15 onto a screen 28. The light from a source 21 is projected onto a mirror 23 through a condenser lens system 22. The light source may, for instance, be a halogen lamp having a rating of 55 watts and 12 volts. The mirror 23 deflects the light through the diaphragm 26 and through the lens 27 onto the screen 28. The diaphragm may comprise radial slots for projecting the markings 15 and/or it may have the necessary spiral slots for projecting the curves 12. The same diaphragm may comprise straight and curved apertures.

The shaft 25 of the selsyn drive 24 extends through a central hole in the mirror 25 and the disk shaped diaphragm 26 is attached to the free end of the shaft 25 in front of the mirror 23. The diaphragms for the straight line markings and for the curved markings are interchangeable.

Although the invention has been described with reference to specific example embodiments, it is to be understood, that it is intended to cover all modifications and equivalents within the scope of the appended claims.

What is claimed is:

1. In a balancing apparatus including means for optically indicating the unbalance of a workpiece on a polar coordinate display screen having an origin and concentric circles, means for displaying on said screen a first optical marking representing in a vectorial manner the magnitude and direction of unbalance of the workpiece, means for displaying on said screen a second optical marking corresponding to a fixed angular position of the workpiece and means for coinciding said first marking and said second marking with each other by rotating the workpiece, wherein the mass distribution of said workpiece may be varied in a given region to remove said unbalance by means of an unbalance compensating tool including tool feed advance means, the improvement wherein said means for displaying said second optical marking comprise means for displaying at least two marking elements to form a display pattern in which the marking elements extend symmetrically with respect to said fixed angular position of the workpiece whereby the marking elements are spaced from each other so that the spacing between said marking elements at circles concentric with said origin corresponds to the angular width of said given region on said workpiece for balancing the workpiece by varying the mass distribution in said region.

2. The apparatus according to claim 1, including milling means for milling off the workpiece an arc having a predetermined depth and radius in said workpiece for unbalancing the workpiece, the improvement wherein said angular spacing between said marking elements at any of said circles about the origin corresponds to the length of said arc required for balancing the workpiece when the first optical marking is positioned on said circle.

3. The apparatus according to claim 2, wherein said two marking elements merge with each other in the vicinity of said origin to form a radially extending straight line for indicating a range wherein balancing may be effected solely by drilling a single hole in said workpiece with said milling means, wherein the lines separate from said straight line at a determined radius from said origin.

4. The apparatus according to claim 1, including means for drilling holes having a determined depth and diameter in said workpiece for balancing said workpiece, the improvement wherein said marking elements are straight line elements extending radially with respect to said origin, whereby the angular spacing between said line elements corresponds to the angular spacing between holes to be drilled for balancing said workpiece and whereby the radial position of said first optical marking corresponds to a balancing quantity.

5. The apparatus according to claim 4, wherein the radial spacing between the origin and said first optical marking corresponds to the number and the depth of one or more holes to be drilled for balancing said workpiece.

6. The apparatus according to claim 4, comprising means for projecting further marking elements onto said display screen for representing the amount of unbalance, means for coupling said projecting means to said tool feed advance means whereby said further marking elements are moved in response to the tool movement until they cross said first optical marking, said crossing indicating that the correct balancing has been accomplished.

7. The apparatus according to claim 6, wherein parts of said further marking elements are straight line elements.

8. The apparatus according to claim 6, wherein parts of said further marking elements are spiral line elements.

9. The apparatus according to claim 1, comprising means for milling off a region of a given arc length on one side of said workpiece, means for drilling a hole on the other side of said workpiece, said means for displaying said second optical marking comprising means for displaying on the screen a first pattern including a first pair of lines symmetrically and angularly spaced from said fixed angular position of said workpiece, the angular spacing between the first pair of lines at any circle corresponding to said arc length, and means for displaying on said screen a second pattern including a second pair of lines extending radially with respect to said origin, the angular spacing between said second pair of lines corresponding to the angular spacing between holes to be drilled on the other side of said workpiece for balancing said workpiece, and wherein the radial position of said first optical marking corresponds to a quantity for balancing said workpiece.

10. The apparatus according to claim 9, comprising means for simultaneously milling off said arc length and drilling said hole.

11. The apparatus according to claim 1, for balancing a workpiece by applying weight means to the circumference of the workpiece, wherein the angular spacing between the two marking elements corresponds to the circumferential length of said weight means at each circle about said origin.

12. In an apparatus for balancing workpieces including means for rotatably supporting a workpiece, balancing means for removing material from or adding material to the workpiece at determined distances from the axis of rotation thereof through an angular range, a display screen, means for displaying a first optical marking on said screen corresponding to the magnitude and angular position of an unbalance of said workpiece, and means for displaying a second optical marking on said screen corresponding to the relative angular distance between the balancing means and the position of an unbalance as represented by the first optical markings; the improvement wherein said means for providing said second optical marking comprises means for projecting a pattern on said screen having a pair of visible lines which extend relative to the origin and are symmetrically, angularly positioned with respect to the position of the first marking and wherein the angular distance between said lines at any circle concentric to said origin corresponds to said angular range.

13. The apparatus according to claim 12, wherein said visible lines are curved lines and emanating from said origin.

14. The apparatus according to claim 12, wherein said lines are straight lines extending radially with respect to said origin.

15. The apparatus according to claim 1, wherein said means for displaying at least two marking elements comprise a diaphragm having radially extending slots therein, said slots having an angular spacing therebetween corresponding to the angular spacing between balancing holes to be drilled in the workpiece, and selsyn means for driving said diaphragm.

16. The apparatus according to claim 1, wherein said means for displaying at least two marking elements comprise a diaphragm having two curved slots therein, said curved slots having an angular spacing from each other which corresponds to an arc length of an arc to be milled off, and selsyn means for driving said diaphragm.

17. The apparatus according to claim 16, wherein said two curved slots merge into a single slot extending radially substantially from the center of said diaphragm.

* * * * *